US010791036B2

(12) United States Patent
Agarwal et al.

(10) Patent No.: US 10,791,036 B2
(45) Date of Patent: *Sep. 29, 2020

(54) INFRASTRUCTURE COSTS AND BENEFITS TRACKING

(71) Applicant: INTERNATIONAL BUSINESS MACHINES CORPORATION, Armonk, NY (US)

(72) Inventors: Vikas Agarwal, Noida (IN); Kuntal Dey, New Delhi (IN); Alwyn R. Lobo, Bangalore (IN); Sougata Mukherjea, New Delhi (IN); Venkatraman Ramakrishna, New Delhi (IN); Meghna Singh, Doha (QA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,209

(22) Filed: May 21, 2019

(65) Prior Publication Data

US 2019/0273661 A1 Sep. 5, 2019

Related U.S. Application Data

(63) Continuation of application No. 14/275,160, filed on May 12, 2014, now Pat. No. 10,367,694.

(51) Int. Cl.
*H04L 12/24* (2006.01)
*G06Q 10/06* (2012.01)
*H04L 12/26* (2006.01)

(52) U.S. Cl.
CPC ......... *H04L 41/145* (2013.01); *G06Q 10/067* (2013.01); *G06Q 10/06312* (2013.01); *H04L 41/046* (2013.01); *H04L 43/045* (2013.01); *H04L 43/08* (2013.01); *H04L 43/0817* (2013.01)

(58) Field of Classification Search
CPC ................................................ G06Q 10/06312
USPC ........................................................ 705/7.22
See application file for complete search history.

(56) References Cited

U.S. PATENT DOCUMENTS

| | | |
|---|---|---|
| 6,311,175 B1 | 10/2001 | Adriaans |
| 7,720,968 B2 | 5/2010 | Clarke |
| 7,747,449 B2 | 6/2010 | Lober |
| 7,908,194 B2 | 3/2011 | Hollas |

(Continued)

FOREIGN PATENT DOCUMENTS

WO 2005004020 A1 1/2005

OTHER PUBLICATIONS

Friedman, Mark J.; List of IBM Patents or Patent Applications Treated as Related; May 21, 2019; 1 page.

*Primary Examiner* — Nadja N Chong Cruz
(74) *Attorney, Agent, or Firm* — Schmeiser, Olsen & Watts; Mark C. Vallone

(57) ABSTRACT

A method and system for tracking an IT infrastructure is provided. The method includes modeling an IT infrastructure as a collection of hardware components, software components, and networking components. An observer agent is deployed on each of the components. The observer agent performs a measurement process with respect to each of the components and a mapping process is performed with respect to the measurement process. An aggregation module is deployed and an aggregation process is performed with respect to results of the mapping process. In response, a two dimensional moving graph indicating results of the aggregation process is generated and displayed.

20 Claims, 11 Drawing Sheets

(56) References Cited

U.S. PATENT DOCUMENTS

| | | |
|---|---|---|
| 8,290,806 B2 | 10/2012 | Lee |
| 2002/0069102 A1 | 6/2002 | Vellante |
| 2003/0088456 A1 | 5/2003 | Ernest |
| 2003/0212643 A1 | 11/2003 | Steele |
| 2006/0168278 A1 | 7/2006 | Lazen |
| 2009/0231152 A1 | 9/2009 | Tung |
| 2009/0281677 A1 | 11/2009 | Botich |
| 2011/0125895 A1 | 5/2011 | Anderson |
| 2011/0145657 A1 | 6/2011 | Bishop |
| 2013/0066670 A1 | 3/2013 | Krishnan |
| 2015/0324712 A1 | 11/2015 | Agarwal |

400

Operation Parameters: Logs and Audits

407

| Worklight Server | WAS | DB2 |
|---|---|---|
| 200 queries/sec audited (10 INFO, 3 WARNING, 2 ERROR) events logged | (50 INFO, 25 WARNING, 8 ERROR) events logged | (15 INFO) events logged |

Baseline Costs and Revenues

Info message cost: 0  Queries/second: 150
Warning message cost: 30%
Error message cot: 100%

Operational Parameters: Machine Health

409

| Machine #1 | Machine #2 | Machine #3 |
|---|---|---|
| 65% CPU | 43% CPU | 58% CPU |

Baseline Costs and Efficiency

- 45% expected CPU usage for normal operation
- Efficiency: 100% up to baseline, linear decrease to 0 beyond

| Baseline benefit | | Baseline benefit | | |
|---|---|---|---|---|
| 150*$2 = $300 | — | 150*$2 = $300 = $30.32 | = | |

FIG. 4B

INFRASTRUCTURE COSTS AND BENEFITS TRACKING

CROSS REFERENCE TO RELATED APPLICATIONS

This application is a continuation application claiming priority to Ser. No. 14/275,160 filed May 12, 2014, now U.S. Pat. No. 10,367,694, issued Jul. 30, 2019, the contents of which are hereby incorporated by reference.

FIELD

The present invention relates generally to a method for tracking an infrastructure and in particular to a method and associated system for tracking benefits and costs associated with an IT infrastructure.

BACKGROUND

Monitoring systems typically includes an inaccurate process with little flexibility. Determining attributes associated with the systems may include a complicated process that may be time consuming and require a large amount of resources. Accordingly, there exists a need in the art to overcome at least some of the deficiencies and limitations described herein above.

SUMMARY

A first aspect of the invention provides a tracking method comprising: modeling, by a computer processor of a computing system, an IT infrastructure as a collection of independent hardware components, software components, and networking components; deploying, by the computer processor, an observer agent on each of the independent hardware components, software components, and networking components; performing, by the computer processor executing each the observer agent, a measurement process with respect to each of the independent hardware components, software components, and networking components, wherein the performing the measurement process comprises measuring incurred costs and benefits associated with each of the independent hardware components, software components, and networking components; performing, by the computer processor executing each the observer agent, a mapping process associated with the measurement process; deploying, by the computer processor, a centralized aggregation module with respect to results of the mapping process; performing, by the computer processor executing the centralized aggregation module with respect to the results of the mapping process, an aggregation process with respect to the results of the mapping process; generating, by the computer processor, a two dimensional moving graph indicating results of said aggregation process; and displaying, by said computer processor, said two dimensional moving graph.

A second aspect of the invention provides a computing system comprising a computer processor coupled to a computer-readable memory unit, the memory unit comprising instructions that when executed by the computer processor implements a method comprising: modeling, by the computer processor, an IT infrastructure as a collection of independent hardware components, software components, and networking components; deploying, by the computer processor, an observer agent on each of the independent hardware components, software components, and networking components; performing, by the computer processor executing each the observer agent, a measurement process with respect to each of the independent hardware components, software components, and networking components, wherein the performing the measurement process comprises measuring incurred costs and benefits associated with each of the independent hardware components, software components, and networking components; performing, by the computer processor executing each the observer agent, a mapping process associated with the measurement process; deploying, by the computer processor, a centralized aggregation module with respect to results of the mapping process; performing, by the computer processor executing the centralized aggregation module with respect to the results of the mapping process, an aggregation process with respect to the results of the mapping process; generating, by the computer processor, a two dimensional moving graph indicating results of the aggregation process; and displaying, by the computer processor, the two dimensional moving graph.

A third aspect of the invention provides a computer program product, comprising a computer readable hardware storage device storing a computer readable program code, the computer readable program code comprising an algorithm that when executed by a computer processor of a computing system implements a method, the method comprising: modeling, by the computer processor, an IT infrastructure as a collection of independent hardware components, software components, and networking components; deploying, by the computer processor, an observer agent on each of the independent hardware components, software components, and networking components; performing, by the computer processor executing each the observer agent, a measurement process with respect to each of the independent hardware components, software components, and networking components, wherein the performing the measurement process comprises measuring incurred costs and benefits associated with each of the independent hardware components, software components, and networking components; performing, by the computer processor executing each the observer agent, a mapping process associated with the measurement process; deploying, by the computer processor, a centralized aggregation module with respect to results of the mapping process; performing, by the computer processor executing the centralized aggregation module with respect to the results of the mapping process, an aggregation process with respect to the results of the mapping process; generating, by the computer processor, a two dimensional moving graph indicating results of the aggregation process; and displaying, by the computer processor, the two dimensional moving graph.

The present invention advantageously provides a simple method and associated system capable of monitoring systems.

BRIEF DESCRIPTION OF THE DRAWINGS

FIG. 1, including

FIG. 4, including FIGS. 4A, 4B, and 4C, illustrates an implementation example illustrating a computation associated with an IT infrastructure, in accordance with embodiments of the present invention.

DETAILED DESCRIPTION

Figure 1A:
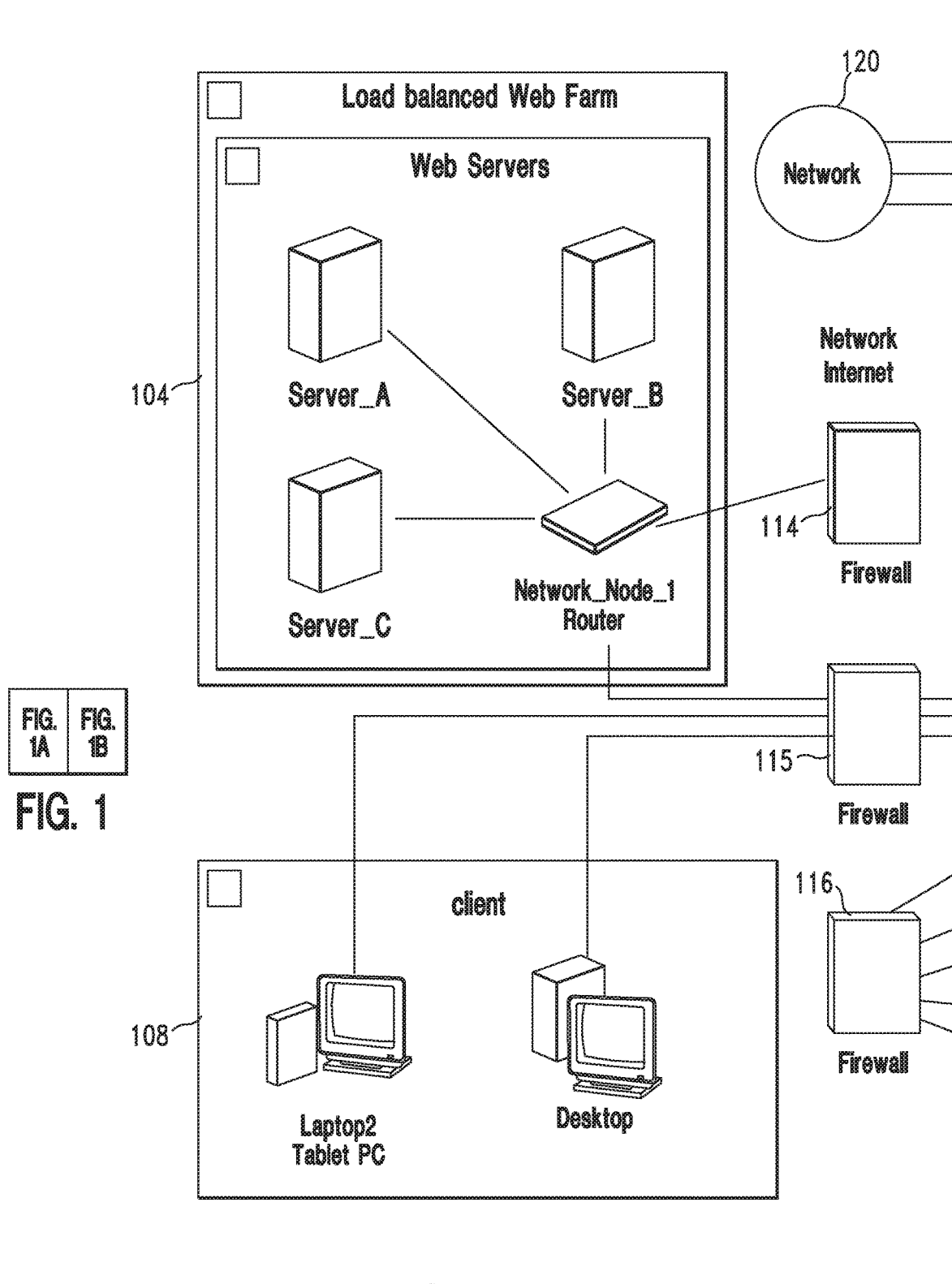
FIGS. 1A and 1B, illustrates an IT infrastructure associated with a process for monitoring, measuring, and tracking costs and benefits associated with the IT infrastructure, in accordance with embodiments of the present invention.
Figure 1B:
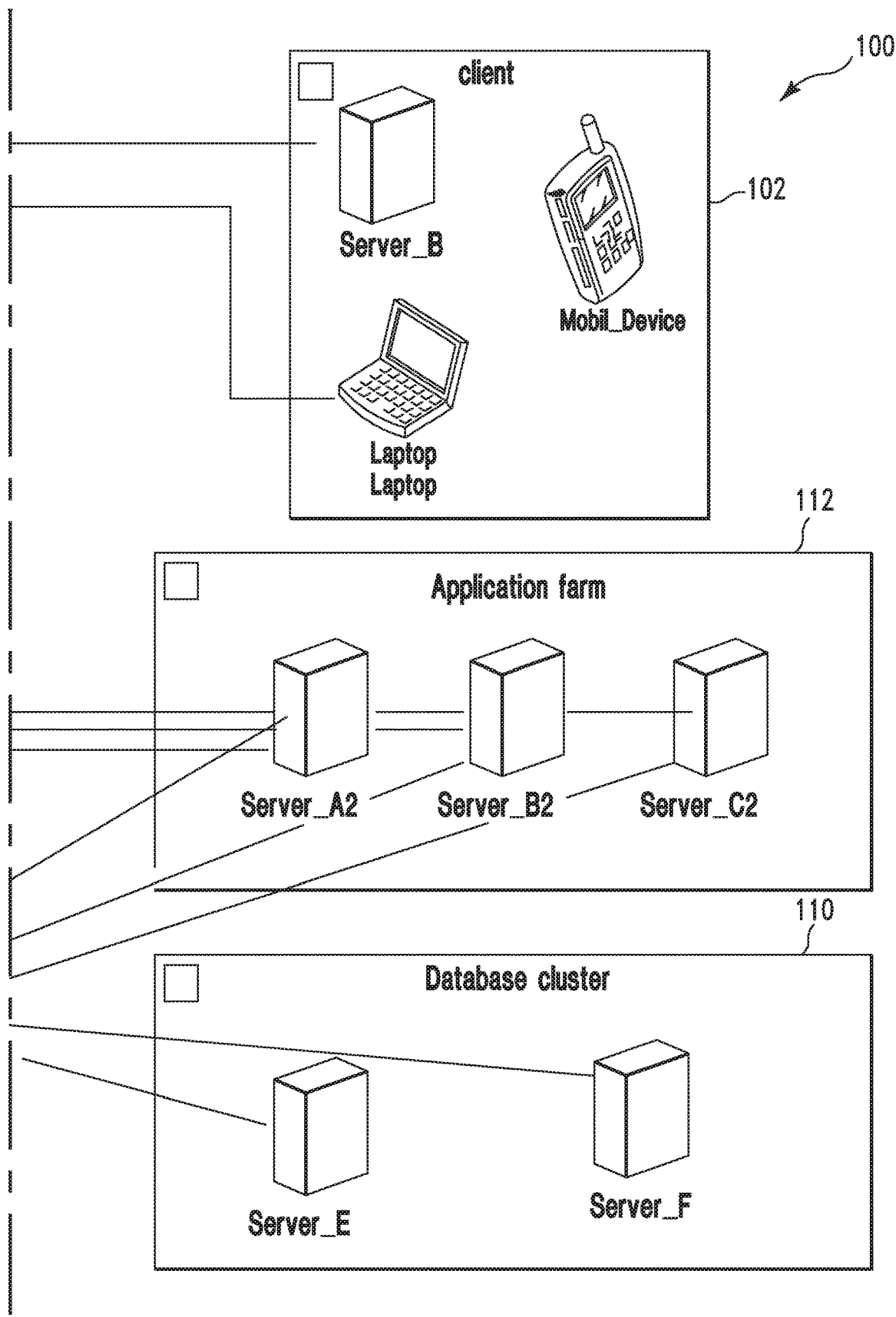

FIG. 1, including FIGS. 1A and 1B, illustrates an IT infrastructure 100 associated with a process for monitoring, measuring, and tracking costs and benefits associated with the IT infrastructure 100, in accordance with embodiments of the present invention. IT infrastructure 100 may be enabled to allow continuous monitoring and tracking of hardware components and software components to determine cost/financial benefits of the IT infrastructure 100. IT infrastructure 100 enables a process for visually tracking health indicators of a hardware module (e.g., CPU activity, memory usage, I/O activity, network activity, etc.) and estimating running costs and benefits (e.g., a return on investment (ROI)) of a complex IT infrastructure. IT infrastructure 100 comprises groups 102, 104, 108, and 110 of hardware and software components connected via firewalls 114, 115, and 116 and/or a network/Internet 120. The groups 102, 104, 108, and 110 of hardware and software components may include, inter alia:

1. Servers and mobile computers.
2. Network hubs, switches, routers, cables, etc.
Data center facilities (on-site or remote).
4. Virtual machines.
5. Software platforms.
6. Security software (e.g., firewall, IDS, etc.).
7. Service software (e.g., web servers).
8. Assistance components (e.g., debuggers, monitors, loggers, etc.).
9. Third party software.
10. Redundant storage.
11. Components to ensure high availability of services.
12. Components to fault tolerance and robustness.

Figure 2:
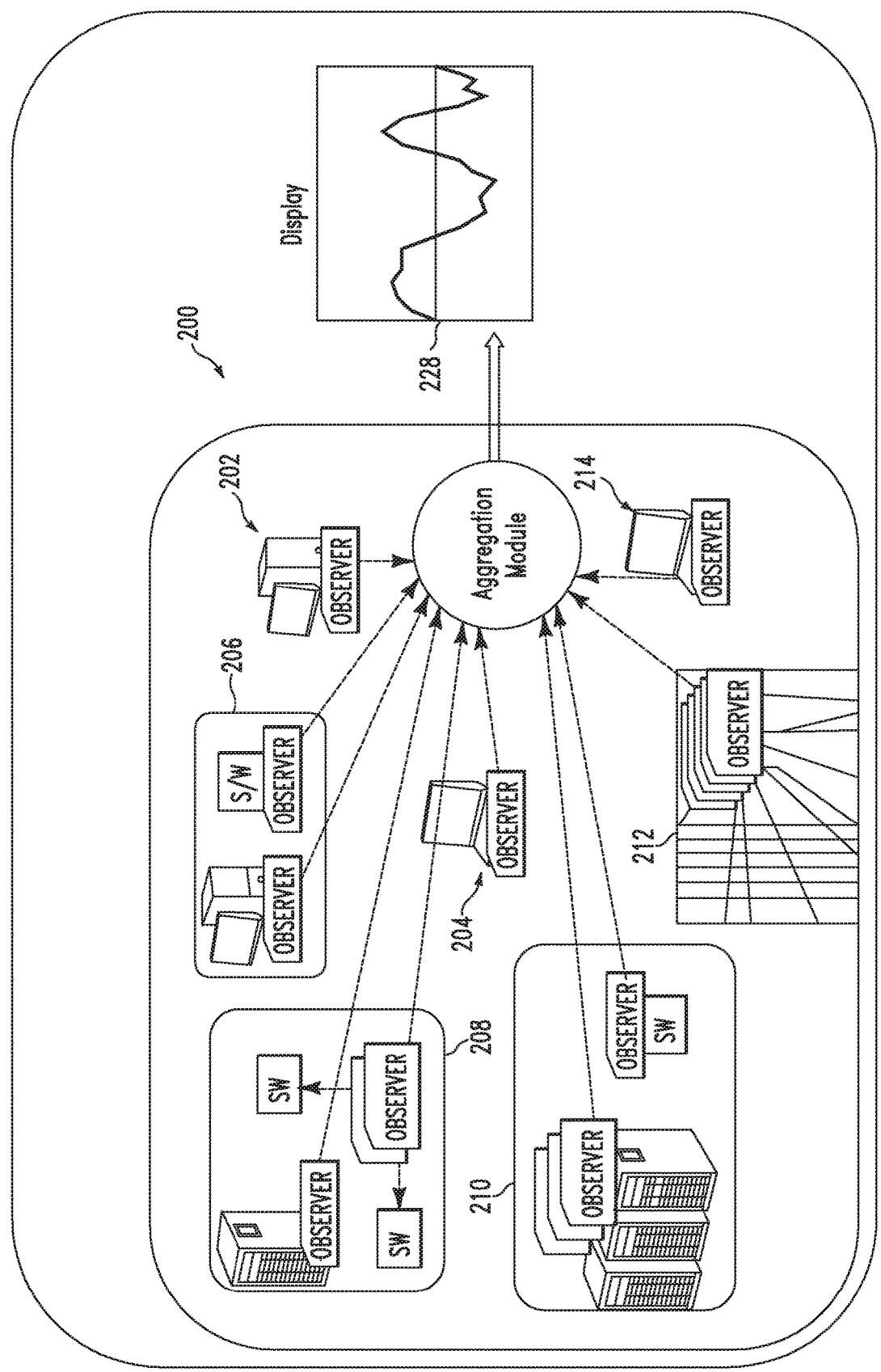
FIG. 2 illustrates a system for monitoring, measuring, and tracking costs and benefits associated with an IT infrastructure, in accordance with embodiments of the present invention.

FIG. 2 illustrates a system 200 for monitoring, measuring, and tracking costs and benefits associated with an IT infrastructure, in accordance with embodiments of the present invention. System 200 comprises a plurality of sub-systems 202, 204, 206, 208, 210, 212, and 214 connected to an aggregation module 224. Aggregation module is connected to a display apparatus 228. Each of sub-systems 202, 204, 206, 208, 210, 212, and 214 comprises at least one computing device (e.g., a desk top computer, a laptop computer, a server, a server farm, a data center, etc.), software, and an observer agent. Each observer agent records its associated component's (i.e., associated computing device(s)) operational parameters (or performance efficiency), and maps it to a monetary value. Every observer agent (periodically) communicates inferred monetary values (i.e., data) to aggregation module 224. Aggregation module 224 calculates a weighted sum of the inferred monetary values and displays them on a continuously updated graph on a 2-D screen via display apparatus 228.

System 200 models the IT infrastructure as a collection of autonomous components (i.e., components of each of sub-systems 202, 204, 206, 208, 210, 212, and 214) that are connected to additional components to provide a set of business or technical capabilities. Each component is associated with an operational cost and provides a revenue benefit. System 200 measures a running cost and benefit of these components (continuously or periodically) and compares them to a baseline cost or revenue expected from the components. Additionally, system 200 derives an overall cost or benefit generated by the network of these components as a monetary value. The instantaneous or periodic monetary cost or benefit is displayed as a two-dimensional graph providing a realistic view of a return-on-investment (RoI) of an IT infrastructure. System 200 enables a process for visually tracking overall running costs and benefits of a complex IT infrastructure by:

1. Modeling the IT infrastructure as a collection of interdependent hardware, software, and networking (communication) components.
2. Deploying an observer agent on every component to measure the cost incurred and benefit provided by an associated component on an instantaneous or periodic basis.
3. Enabling observer agents to map a cost and benefit to an incremental monetary value (e.g., in US Dollars).
4. Deploying a centralized aggregation module to perform a weighted aggregation of monetary values received from all observer agents and derive overall monetary cost or benefit of the IT infrastructure at a given instant.
5. Displaying an instantaneous monetary cost or benefit on a graph on a two-dimensional screen for human inspection.

Measurement criteria associated with the aforementioned process for measuring an incurred cost and benefit are associated with the following operating parameters:

1. Hardware parameters: optimal CPU usage, optimal memory usage, I/O read and write latencies, network bandwidth utilization, network latency, network (router) throughput, etc.
2. Software parameters: query throughput, query processing latency, classify operations, processes, services, troubleshooting, failover, error-recovery, etc.
3. Miscellaneous parameters: electricity consumption, water supply, air conditioning, floor space rent for data centers, etc.

Baseline parameters may be obtained via specification by a user/enterprise administrator, AI or statistical techniques, etc. Mapping operating parameters to monetary values may be specified by a user/enterprise administrator as follows:

1. A revenue gain or loss as a function of unit increase or decrease in query processing rates (or percentages).
2. A cost increase or decrease as a function of unit increase or decrease in operating parameter values (or percentages).
3. A function MF: parameter-efficiency=$$

A process for tracking and measuring operating parameters is described as follows:

Observer agents running on IT system components are programmed to record monetary values of observed features at frequent intervals. Observed features may include, inter alia:
1. System health indicators such as CPU, memory, I/O activity, network activity.
2. System logs and audits.

A measurement process (executed by an observer agent) associated with measuring incurred costs and benefits for components of each of sub-systems 202, 204, 206, 208, 210, 212, and 214 is described as follows:
1. For each component ($M_i$).
    A. For each health indicator ($H_j$).
        a. Record a current operational parameter value: ($p_j$).
        b. Find a difference between current and baseline value: ($p_j-b_j$).
        c. Determine an efficiency value of the module w.r.t for parameter: ($p_j-b_j$)/$b_j$.
        d. Executing a mapping function to convert the determined efficiency value to a monetary value (positive or negative): $MF((p_j-b_j)/b_j)$.

An aggregation process (executed by aggregation module 224) associated with aggregating values calculated by the observer agent is described as follows:
1. Sum over all modules and associated health indicators: $\Sigma_i \Sigma_j MF((p_j-b_j)/b_j)$.
2. Transmit the summation to a display agent.

A process (executed by system 200) for visually tracking running costs and benefits of an IT infrastructure is described as follows:
1. Observer agents are deployed on every software component, hardware component, and networking component in the IT infrastructure to measure benefits and costs.
2. Each observer agent tracks health indicators of a hardware module. For example, CPU activity, memory usage, I/O activity, network activity, etc.
3. Each observer agent tracks a query servicing efficiency of an associated software module.
4. Each observer agent monitors logs and audits of an associated software module to determine if the associated software module is performing useful work for a specified time period.
5. Each observer agent monitors networking elements (e.g., routers, switches, etc.) to determine efficiency.
6. Each observer agent tracks an ON/OFF status associated with a hardware module or software module to determine the associated hardware module or software module is performing useful work or just incurring an unnecessary cost.
7. Each observer agent compares tracked performance to baseline benefits and costs to determine an efficiency of an associated component. Baseline benefits and costs may be specified by a user or generated via artificial intelligence and statistical techniques.
8. Each observer agent maps an efficiency of an associated component to a monetary value based on a valuation function specified by a human user or administrator.
9. Each observer agent estimates an impact of an associated component on the IT infrastructure based on a degree to which that component is connected to other components and factors impacting a benefit and cost computation.
10. An aggregation module aggregates all values received from the observer agents in an IT infrastructure to generate a monetary benefit or cost value for a given time instant. The monetary benefit or cost value of an IT infrastructure varying over time may be tracked on a 2-dimensional graph on a display device (as described with respect to FIG. 3, infra).
11. Running costs and benefits of a single unit or a sub-group of components within an IT infrastructure are measured and visually tracked.
12. A return-on-investment (RoI) associated with reconfiguring an IT infrastructure may be determined on an instantaneous basis. The RoI calculation is performed by using predictive analytics to determine an effect on the overall system with respect to adding or removing sub-components.

Figure 3:
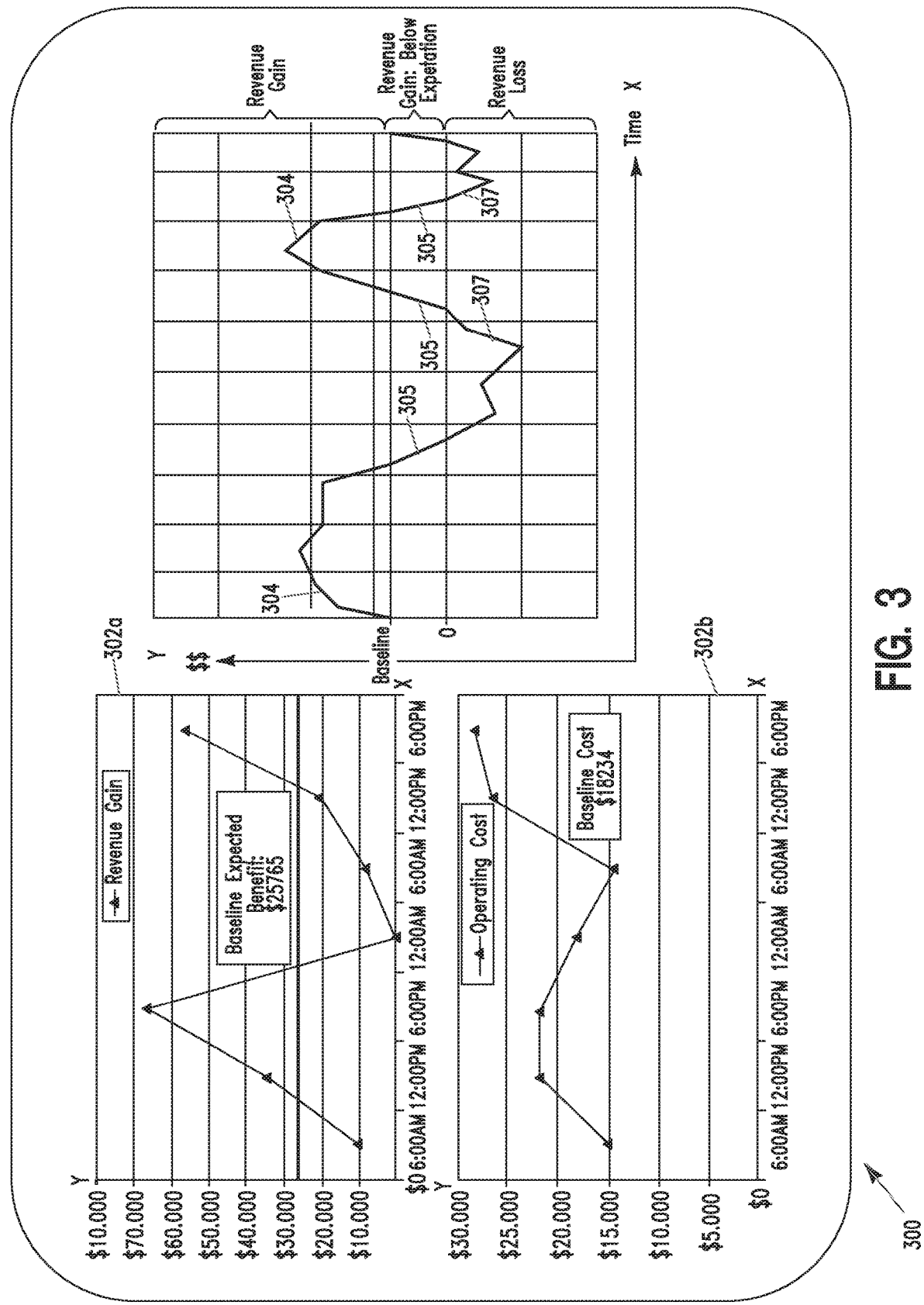
FIG. 3 illustrates a visualization interface for displaying two dimensional graphs for presenting monetary benefits or cost values of an IT infrastructure varying over time, in accordance with embodiments of the present invention.

FIG. 3 illustrates a visualization interface 300 for displaying two dimensional graphs 302a, 302b, and 302c presenting monetary benefits or cost values of an IT infrastructure varying over time, in accordance with embodiments of the present invention. Each X-axis represents a moving time window. Each Y-axis represents a monetary value. Two dimensional graphs 302a, 302b, and 302c collectively illustrate an example of a visual cost/benefit tracking presentation on a 2-dimensional graphical user interface. Two dimensional graphs 302a illustrates a variation plot with respect to a revenue benefit gained by a sample IT infrastructure. Two dimensional graph 302b illustrates a cost variation comprising monetary values (e.g., U.S. dollars). Two dimensional graph 302c an user observed display comprising variations indicated as belonging to different zones: higher than expected revenue gain 304, lower than expected revenue gain 305, and a net loss 307. Two dimensional graph 302c additionally presents an expected revenue gain or baseline.

Figure 4A:
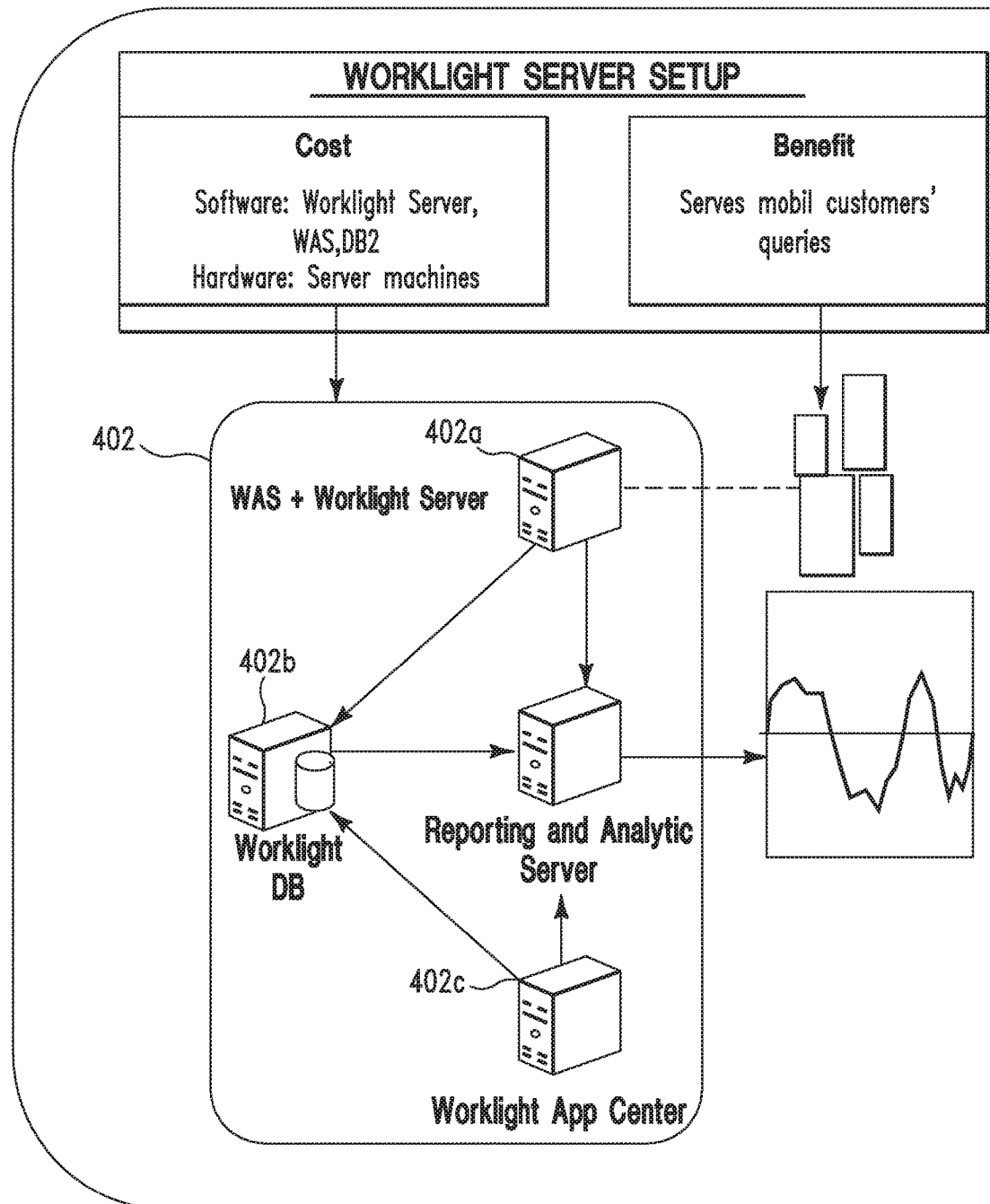
Figure 4C:
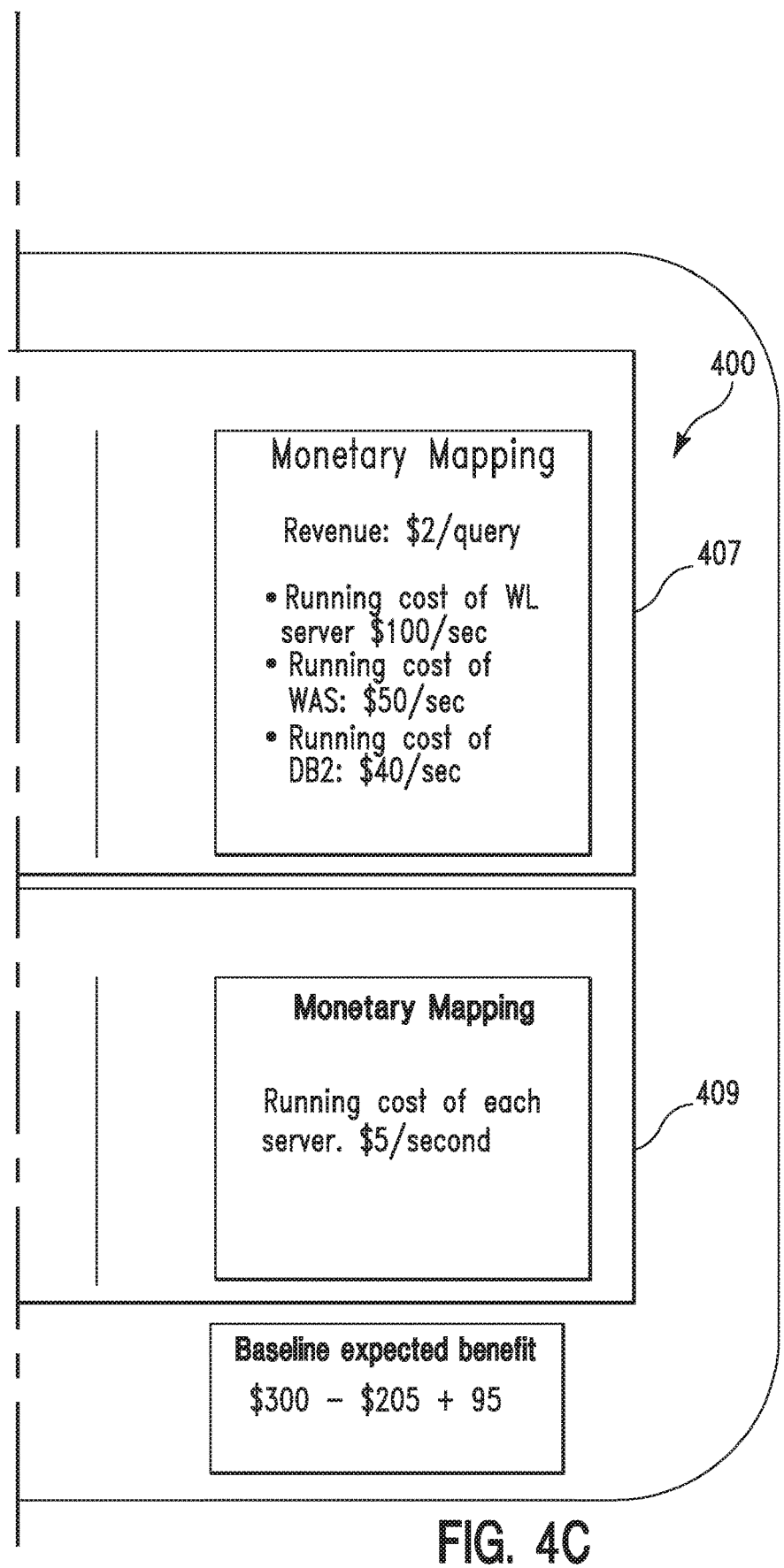

FIG. 4, including FIGS. 4A, 4B, and 4C, illustrates an implementation example illustrating a computation associated with an IT infrastructure 402, in accordance with embodiments of the present invention. IT infrastructure 402 comprises hardware components 402a, 402b, and 402c and associated software components Worklight Server, WAS/Web Sphere Application Server, and DB2 Database Manager. Parameters 407 illustrate details with respect to observations and baseline values. Parameters 409 illustrate computations associated with baseline/expected benefit values, cost values, and net revenue gain values.

Figure 5A:
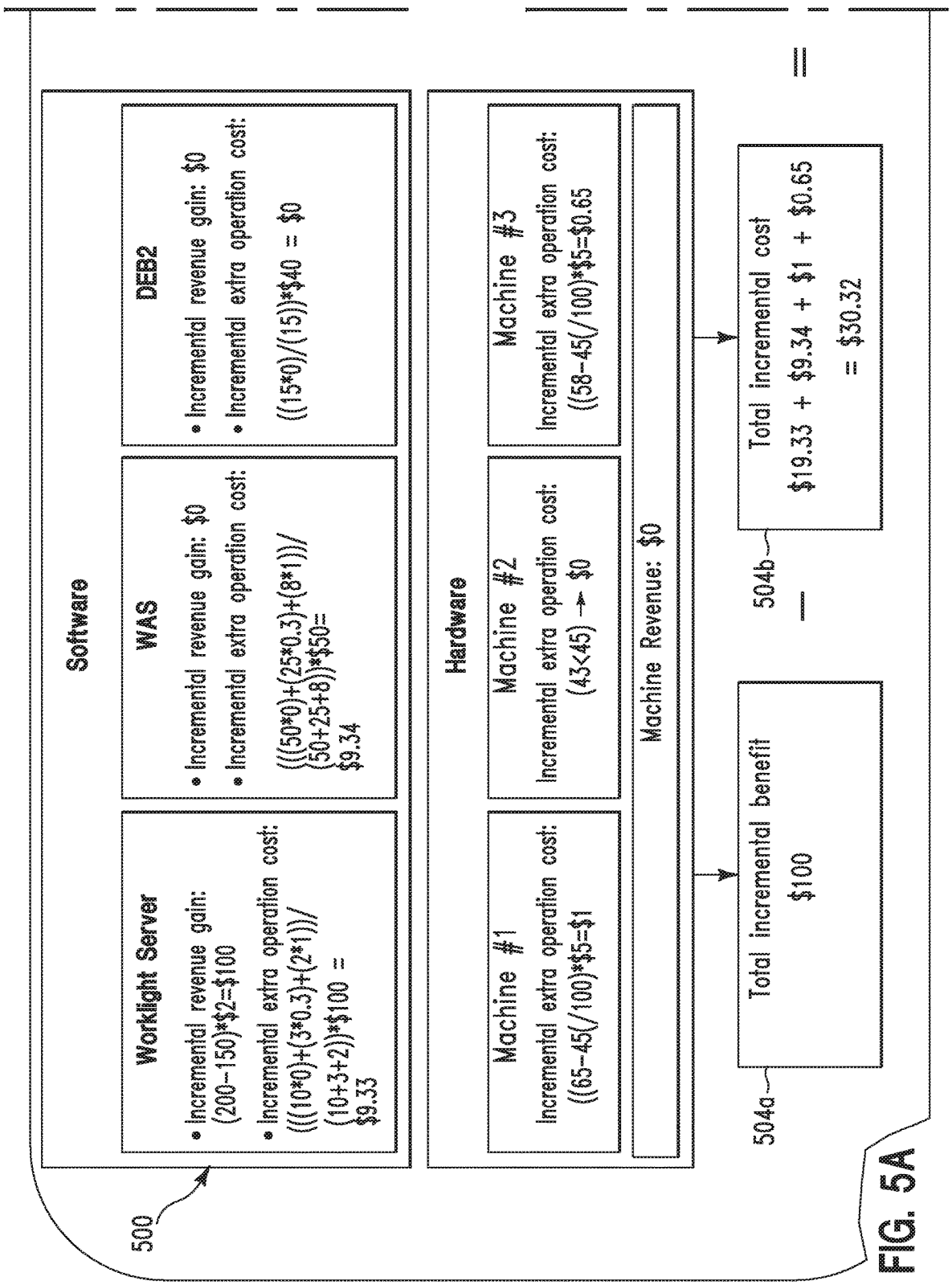
FIGS. 5A and 5B, illustrates an implementation example illustrating a computation associated with operating performance/efficiency for every component of an IT infrastructure, in accordance with embodiments of the present invention.
Figure 5:
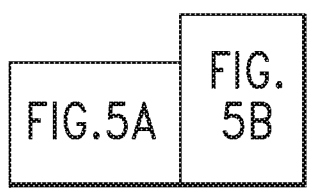
FIG. 5, including
Figure 5B:
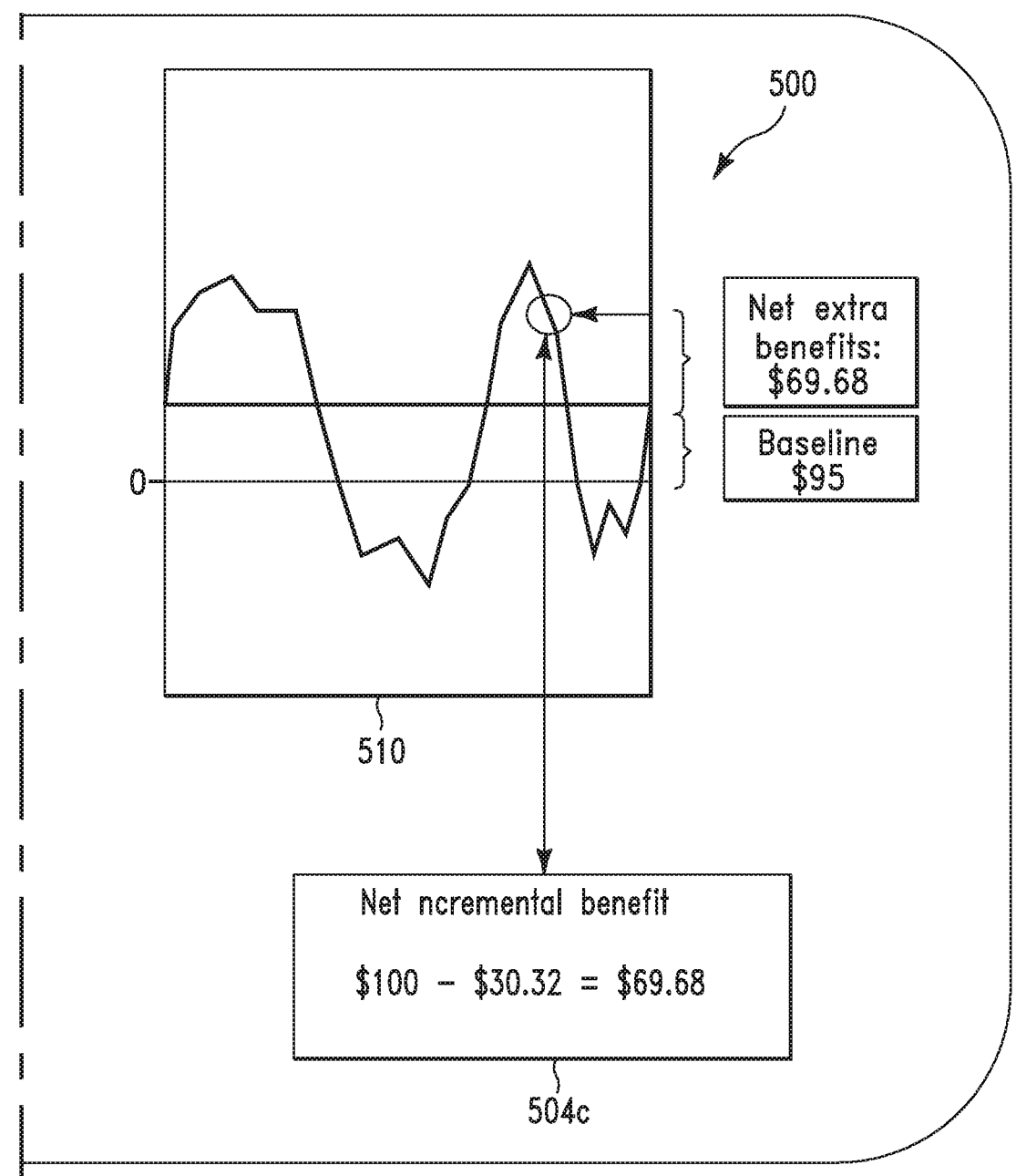

FIG. 5, including FIGS. 5A and 5B, illustrates an implementation example 500 illustrating a computation associated with operating performance/efficiency of every component of an IT infrastructure, in accordance with embodiments of the present invention. Implementation example 500 illustrates subsequent mapping to a monetary value via the mapping functions illustrated in FIG. 4. Blocks 504a . . . 504c illustrate incremental benefits and cost computations and a net incremental benefit. Graph 510 illustrates a time instant at which the computation takes place and subsequent marking of the computed net incremental benefit value.

Figure 6:
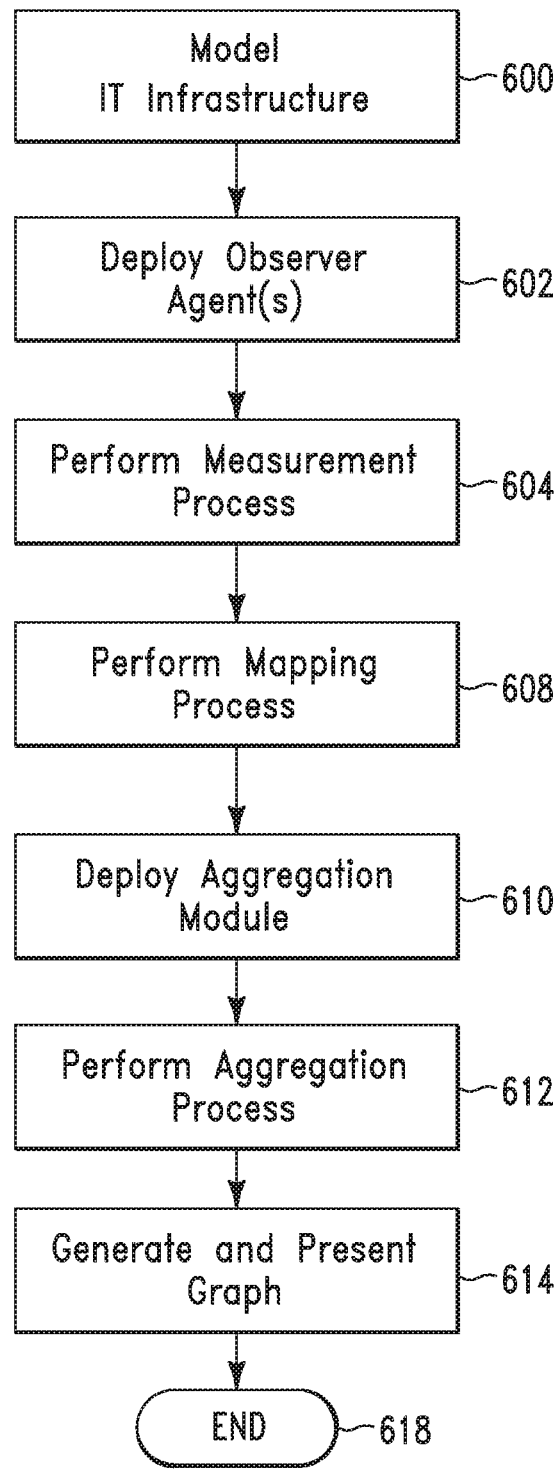
FIG. 6 illustrates an algorithm detailing a process flow enabled by the system of FIG. 2 for monitoring, measuring, and tracking costs and benefits associated with an IT infrastructure, in accordance with embodiments of the present invention

FIG. 6 illustrates an algorithm detailing a process flow enabled by system 200 of FIG. 2 for monitoring, measuring, and tracking costs and benefits associated with an IT infrastructure, in accordance with embodiments of the present invention. Each of the steps in the algorithm of FIG. 6 may be enabled and executed in any order by a computer processor executing computer code. In step 600, an IT infrastructure is modeled as a collection of independent hardware components, software components, and networking components. In step 602, an observer agent is deployed on each of the independent hardware components, software components, and networking components. In step 604, a measurement process is performed (by each of the observer agents) with respect to each of the independent hardware components, software components, and networking components.

The measurement process includes measuring incurred costs and benefits associated with each of the independent hardware components, software components, and networking components. In step 608, a mapping process associated with the measurement process is performed. In step 610, a centralized aggregation module is deployed with respect to results of the mapping process. In step 612, an aggregation process is performed with respect to results of the mapping process. In step 614, a two dimensional moving graph indicating results of the aggregation process is generated and displayed for a user and the process is terminated in step 618.

Figure 7:
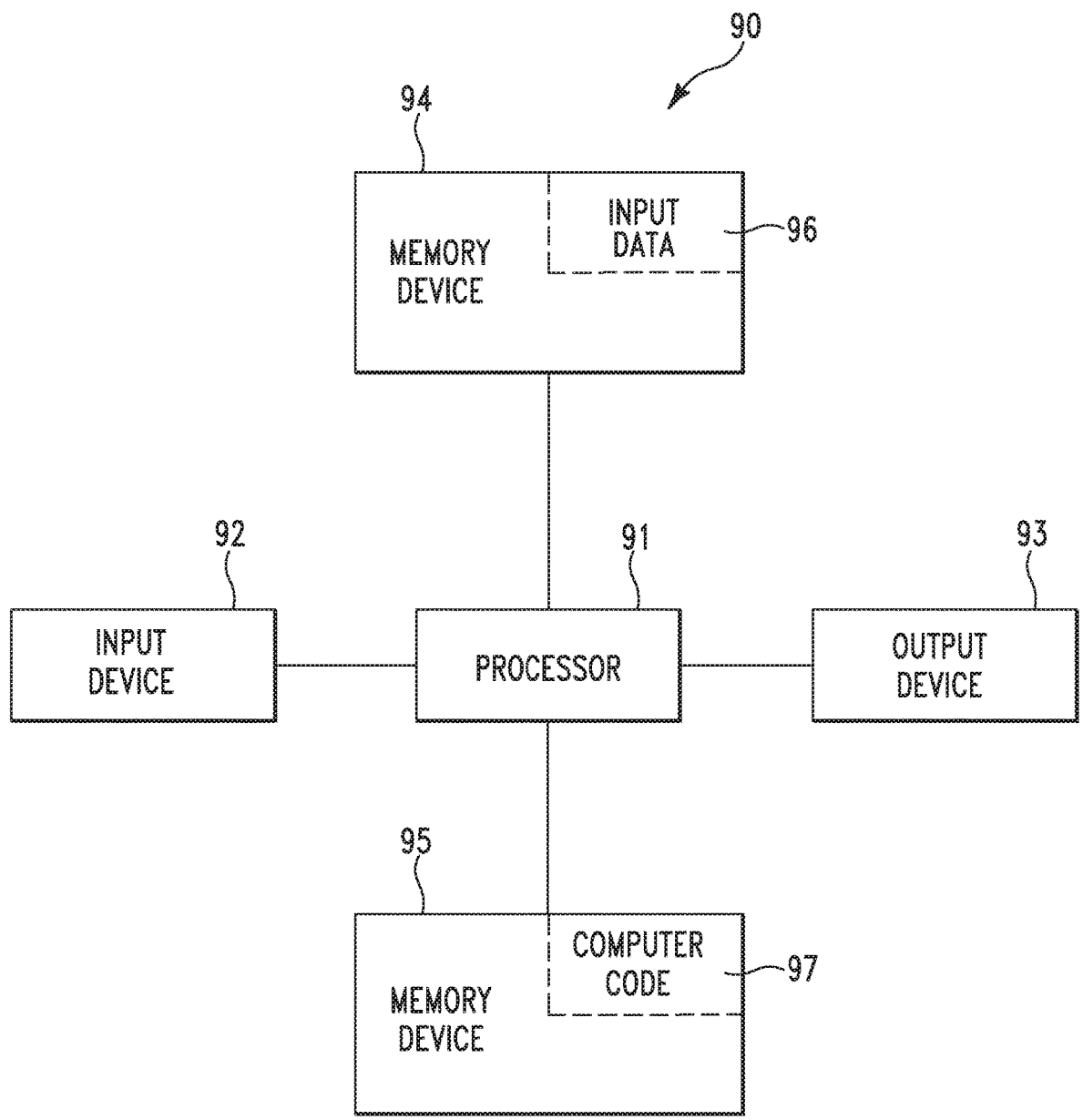
FIG. 7 illustrates a computer system used by or comprised by the systems of FIGS. 1 and 2 for monitoring, measuring, and tracking costs and benefits associated with an IT infrastructure, in accordance with embodiments of the present invention.

FIG. 7 illustrates a computer system 90 used by or comprised by the systems of FIGS. 1 and 2 for monitoring, measuring, and tracking costs and benefits associated with an IT infrastructure, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 6) for monitoring, measuring, and tracking costs and benefits associated with an IT infrastructure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may include the algorithm of FIG. 6 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to monitor, measure, and track costs and benefits associated with an IT infrastructure. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for monitoring, measuring, and tracking costs and benefits associated with an IT infrastructure. In another embodiment, the invention provides a business method that performs the process steps of the invention on a subscription, advertising, and/or fee basis. That is, a service supplier, such as a Solution Integrator, could offer to monitor, measure, and track costs and benefits associated with an IT infrastructure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A tracking and IT infrastructure reconfiguring method comprising:
    modeling and enabling, by a computer processor of a special purpose hardware based computing system, an IT infrastructure as a collection of independent hardware components, software components, and networking components, wherein said IT infrastructure comprises electronic circuitry comprising a programmable logic array utilizing state information of specialized firmware program code configured to execute specialized software for personalizing said electronic circuitry for performing said tracking and IT infrastructure reconfiguring method;
    deploying, by said computer processor, an observer agent on each of said independent hardware components, software components, and networking components, wherein said independent hardware components, software components, and networking components comprise servers, network hubs, network switches, network routers, network cables, virtual machines, security software, debuggers, monitors, and loggers;
    performing, by said computer processor executing each said observer agent, a measurement process with respect to each of said independent hardware components, software components, and networking components, wherein said performing said measurement process comprises:
        measuring hardware parameters comprising optimal CPU usage, optimal memory usage, I/O read and write latencies, network bandwidth utilization, network latency, and router throughput;
        measuring software parameters comprising: query throughput, query processing latency, classify operations, troubleshooting parameters, failover issues, and error-recovery parameters;
        measuring additional parameters comprising electricity consumption, water supply attributes, and air conditioning attributes; and
        measuring incurred costs and benefits associated with each of said independent hardware components, software components, and networking components;
    deploying, by said computer processor, a centralized aggregation module with respect to results of a mapping process associated with said measurement process;
    performing, by said computer processor executing said centralized aggregation module with respect to said results of said mapping process, an aggregation process with respect to said results of said mapping process;
generating and displaying, by said computer processor, a two dimensional moving graph indicating results of said aggregation process;
first tracking, by said computer processor executing each said observer agent, a query detecting an operating performance efficiency of an associated software module;
second tracking, by said computer processor executing each said observer agent, health indicators of said hardware components, wherein said health indicators are selected from the group consisting of CPU activity, memory usage, I/O activity, and network activity;
monitoring, by said computer processor executing each said observer agent, said network components to determine a network efficiency level of said network components;
determining, by said computer processor via execution artificial intelligence, efficiency levels of each of said hardware components, said software components, and said networking components; and
reconfiguring, based on results of said performing said measurement process, and results of said first tracking, results of said second tracking, results of said monitoring, and results of said determining, said independent hardware components, software components, and networking components of said IT infrastructure such that a group of specified components, selected based on based on recorded operational parameters and performance efficiency detected during said measurement process, of said hardware components, software components, and networking components are removed from and added to said IT infrastructure thereby benefitting operational and technical capabilities of said IT infrastructure by executing troubleshooting, failover, and error-recovery processes such that said group of specified components are configured to ensure a high availability of services executed by said IT infrastructure.

2. The method of claim 1, further comprising:
tracking, by said computer processor executing each said observer agent, query servicing efficiency of said software components.

3. The method of claim 1, further comprising:
monitoring, by said computer processor executing each said observer agent, logs and audits of said software components to determine a specified time period associated with specified work functions.

4. The method of claim 1, further comprising:
monitoring, by said computer processor executing each said observer agent, said networking components to determine associated efficiency levels.

5. The method of claim 1, further comprising:
tracking, by said computer processor executing each said observer agent, an ON/OFF status for said hardware components and said software components to determine specified work functions with respect to incurring a cost.

6. The method of claim 1, further comprising:
tracking, by said computer processor executing each said observer agent performance, levels of said hardware components, said software components, and said networking components to baseline benefits and costs of said hardware components, said software components, and said networking components.

7. The method of claim 1, further comprising:
measuring and visually tracking, by said computer processor, running costs and benefits of a single unit of said hardware components, said software components, and said networking components or a sub-group of components of said hardware components, said software components, and said networking components.

8. The method of claim 1, further comprising:
determining instantaneously, by said computer processor, a return-on-investment (RoI) value associated with reconfiguring said IT infrastructure.

9. The method of claim 1, further comprising:
calculating, by said computer processor, a return-on-investment (RoI) value using predictive analytics to determine an effect on said IT infrastructure with respect to said adding or removing at least one of said hardware components, said software components, and said networking components.

10. The method of claim 1, wherein said measuring is performed periodically.

11. The method of claim 1, wherein said performing said mapping process comprises:
mapping said incurred costs and benefits to monetary values.

12. The method of claim 11 wherein said performing said mapping process further comprises:
mapping efficiency values of said hardware components, said software components, and said networking components to monetary values associated with said hardware components, said software components, and said networking components based on a valuation function specified by a user.

13. The method of claim 11, wherein said performing said mapping process further comprises:
estimating an impact of said hardware components, said software components, and said networking components with respect to said IT infrastructure based on a connection degree with respect to aid hardware components, said software components, and said networking components.

14. The method of claim 1, wherein said performing said aggregation process comprises:
performing a weighted aggregation of said monetary values; and
deriving an overall monetary cost or benefit of said IT infrastructure at a specified time period.

15. The method of claim 1, wherein said modeling comprises:
determining baseline operating parameters for said independent hardware components, software components, and networking components.

16. The method of claim 15, wherein said baseline operating parameters are specified by a user or determined via artificial intelligence and statistical techniques.

17. The method of claim 1, further comprising:
providing at least one support service for at least one of creating, integrating, hosting, maintaining, and deploying computer-readable code in the computing system, said code being executed by the computer processor to implement: said modeling, said deploying said observer agent, said performing said measurement process, said deploying said centralized aggregation module, said performing said aggregation process, said generating, and said displaying.

18. A special purpose hardware based computing system comprising a computer processor coupled to a computer-readable memory unit, said memory unit comprising instructions that when executed by the computer processor implements a tracking and IT infrastructure reconfiguring method comprising:

modeling and enabling, by said computer processor, an IT infrastructure as a collection of independent hardware components, software components, and networking components, wherein said IT infrastructure comprises electronic circuitry comprising a programmable logic array utilizing state information of specialized firmware program code configured to execute specialized software for personalizing said electronic circuitry for performing said tracking and IT infrastructure reconfiguring method;

deploying, by said computer processor, an observer agent on each of said independent hardware components, software components, and networking components, wherein said independent hardware components, software components, and networking components comprise servers, network hubs, network switches, network routers, network cables, virtual machines, security software, debuggers, monitors, and loggers;

performing, by said computer processor executing each said observer agent, a measurement process with respect to each of said independent hardware components, software components, and networking components, wherein said performing said measurement process comprises:

measuring hardware parameters comprising optimal CPU usage, optimal memory usage, I/O read and write latencies, network bandwidth utilization, network latency, and router throughput;

measuring software parameters comprising: query throughput, query processing latency, classify operations, troubleshooting parameters, failover issues, and error-recovery parameters;

measuring additional parameters comprising electricity consumption, water supply attributes, and air conditioning attributes; and measuring incurred costs and benefits associated with each of said independent hardware components, software components, and networking components;

deploying, by said computer processor, a centralized aggregation module with respect to results of a mapping process associated with said measurement process;

performing, by said computer processor executing said centralized aggregation module with respect to said results of said mapping process, an aggregation process with respect to said results of said mapping process;

generating and displaying, by said computer processor, a two dimensional moving graph indicating results of said aggregation process;

first tracking, by said computer processor executing each said observer agent, a query detecting an operating performance efficiency of an associated software module;

second tracking, by said computer processor executing each said observer agent, health indicators of said hardware components, wherein said health indicators are selected from the group consisting of CPU activity, memory usage, I/O activity, and network activity;

monitoring, by said computer processor executing each said observer agent, said network components to determine a network efficiency level of said network components;

determining, by said computer processor via execution artificial intelligence, efficiency levels of each of said hardware components, said software components, and said networking components; and reconfiguring, based on results of said performing said measurement process, and results of said first tracking, results of said second tracking, results of said monitoring, and results of said determining, said independent hardware components, software components, and networking components of said IT infrastructure such that a group of specified components, selected based on based on recorded operational parameters and performance efficiency detected during said measurement process, of said hardware components, software components, and networking components are removed from and added to said IT infrastructure thereby benefitting operational and technical capabilities of said IT infrastructure by executing troubleshooting, failover, and error-recovery processes such that said group of specified components are configured to ensure a high availability of services executed by said IT infrastructure.

19. A computer program product, comprising a computer readable hardware storage device storing a computer readable program code, said computer readable program code comprising an algorithm that when executed by a computer processor of a special purpose hardware based computing system implements a tracking and IT infrastructure reconfiguring method, said method comprising:

modeling and enabling, by said computer processor, an IT infrastructure as a collection of independent hardware components, software components, and networking components, wherein said IT infrastructure comprises electronic circuitry comprising a programmable logic array utilizing state information of specialized firmware program code configured to execute specialized software for personalizing said electronic circuitry for performing said tracking and IT infrastructure reconfiguring method;

deploying, by said computer processor, an observer agent on each of said independent hardware components, software components, and networking components, wherein said independent hardware components, software components, and networking components comprise servers, network hubs, network switches, network routers, network cables, virtual machines, security software, debuggers, monitors, and loggers;

performing, by said computer processor executing each said observer agent, a measurement process with respect to each of said independent hardware components, software components, and networking components, wherein said performing said measurement process comprises:

measuring hardware parameters comprising optimal CPU usage, optimal memory usage, I/O read and write latencies, network bandwidth utilization, network latency, and router throughput;

measuring software parameters comprising: query throughput, query processing latency, classify operations, troubleshooting parameters, failover issues, and error-recovery parameters;

measuring additional parameters comprising electricity consumption, water supply attributes, and air conditioning attributes; and measuring incurred costs and benefits associated with each of said independent hardware components, software components, and networking components;

deploying, by said computer processor, a centralized aggregation module with respect to results of a mapping process associated with said measurement process;

performing, by said computer processor executing said centralized aggregation module with respect to said results of said mapping process, an aggregation process with respect to said results of said mapping process;

generating and displaying, by said computer processor, a two dimensional moving graph indicating results of said aggregation process;

first tracking, by said computer processor executing each said observer agent, a query detecting an operating performance efficiency of an associated software module;

second tracking, by said computer processor executing each said observer agent, health indicators of said hardware components, wherein said health indicators are selected from the group consisting of CPU activity, memory usage, I/O activity, and network activity;

monitoring, by said computer processor executing each said observer agent, said network components to determine a network efficiency level of said network components;

determining, by said computer processor via execution artificial intelligence, efficiency levels of each of said hardware components, said software components, and said networking components; and reconfiguring, based on results of said performing said measurement process, and results of said first tracking, results of said second tracking, results of said monitoring, and results of said determining, said independent hardware components, software components, and networking components of said IT infrastructure such that a group of specified components, selected based on based on recorded operational parameters and performance efficiency detected during said measurement process, of said hardware components, software components, and networking components are removed from and added to said IT infrastructure thereby benefitting operational and technical capabilities of said IT infrastructure by executing troubleshooting, failover, and error-recovery processes such that said group of specified components are configured to ensure a high availability of services executed by said IT infrastructure.

20. The computer program product of claim 19, wherein said method further comprises:

tracking, by said computer processor executing each said observer agent, query servicing efficiency of said software components.

* * * * *